United States Patent
Clock (10) Patent No.: US 8,690,359 B1
(45) Date of Patent: Apr. 8, 2014

(54) WINDOW WELL PROJECTION SYSTEM

(76) Inventor: Wesley Clock, Tooele, UT (US)

( * ) Notice: Subject to any disclaimer, the term of this patent is extended or adjusted under 35 U.S.C. 154(b) by 411 days.

(21) Appl. No.: 13/011,261

(22) Filed: Jan. 21, 2011

Related U.S. Application Data (60) Provisional application No. 61/296,913, filed on Jan. 21, 2010.

(51) Int. Cl.
*G03B 21/28* (2006.01)
*G02B 23/08* (2006.01)

(52) U.S. Cl.
USPC ............................................. 353/99; 359/402

(58) Field of Classification Search
USPC ..................... 353/99; 359/402–432, 841–866
See application file for complete search history.

(56) References Cited

U.S. PATENT DOCUMENTS

| | | | |
|---|---|---|---|
| 2,176,554 A | 10/1939 | Hardy | |
| 2,181,453 A | 11/1939 | Gelakoski | |
| 4,260,217 A | 4/1981 | Traeger et al. | |
| 4,805,971 A | 2/1989 | Fantone | |
| 4,934,246 A | 6/1990 | Benson et al. | |
| 5,265,360 A | 11/1993 | Reiss et al. | |
| 6,082,869 A | 7/2000 | Draheim | |
| 6,700,689 B2 * | 3/2004 | Kung | 359/225.1 |
| 7,279,675 B2 | 10/2007 | Cohen | |

FOREIGN PATENT DOCUMENTS

| | | | | |
|---|---|---|---|---|
| CA | 2303691 A1 | * | 10/2001 | |
| DE | 19932054 A1 | * | 1/2001 | |
| FR | 2509034 A | * | 1/1983 | |

* cited by examiner

*Primary Examiner* — Thanh Luu
(74) *Attorney, Agent, or Firm* — Robert C. Montgomery; Montgomery Patent & Design (57) ABSTRACT

A system for basement window wells that enables internal occupants a view of the surrounding outdoor landscape is herein described, comprising a periscope-type mechanism comprising a pair of mirrors which mount within a window well area. An upper portion of the system comprises a mirror which reflects light and scenery downward. A bottom portion of the system comprises a second minor which projects said light and scenery through a below-grade window portion of a building. A protective transparent plastic cover maintains a watertight construction.

12 Claims, 10 Drawing Sheets

WINDOW WELL PROJECTION SYSTEM

RELATED APPLICATIONS

The present invention was first described in and claims the benefit of U.S. Provisional Application No. 61/296,913 filed Jan. 21, 2010, the entire disclosures of which are incorporated herein by reference.

FIELD OF THE INVENTION

The present invention relates generally to windows mounted within sub-grade window wells, and in particular, to an adjustable mirror assembly for increasing incidence of light from an outdoor area through the window well and window.

BACKGROUND OF THE INVENTION

Windows are important building fixtures for primarily two reasons—the ingress of ambient light source into a building, which mitigates energy needs from manmade lighting, and for affording an external view which allows observance of a proximal outdoor area. This view allows persons to both monitor a nearby area and provides a generally more pleasant ambiance which can contribute to general mental wellbeing. The incidence of natural light also provides a number of other benefits such as the ability to foster healthy plants indoors.

Sub-grade rooms such as basements are often provided with windows, but due to their below grade construction, such windows are typically located within a window well which provides room occupants only a small amount of light and a view of the inside of the window well. However, this limits many of the above-stated positive benefits of windows such as the pleasant atmosphere provided by a view of the outdoors. Lack of a strong incoming light generally increases electric lighting requirements for the area. Energy costs are particularly exasperated in the case where this manmade lighting is utilized to provide light for plants.

Various attempts have been made to provide windows with integral assemblies altering the view provided by the window. Examples of these attempts can be seen by reference to several U.S. patents. U.S. Pat. No. 5,265,360, issued in the name of Reiss et al., describes a window view assembly including a portable decoration and housing which can be placed within a window frame. The apparatus includes a plurality of angled panels depicting a desired decorative scene and a window sash which hides the edges of the assembly and lends a sense of perspective to the scene within the window frame.

U.S. Pat. No. 6,082,869, issued in the name of Draheim, describes a safety minor assembly mounted along an exterior portion of a door-mounted window. The Draheim apparatus is particularly suited for outwardly opening doors and allows a user to view the peripheral exterior area of the door in order to ensure that the area is clear prior to opening the door.

While these apparatuses fulfill their respective, particular objectives, each of these references suffer from one (1) or more of the aforementioned disadvantages. Many such apparatuses affect the view through a window such that it cannot be used in a conventional observational manner. Also, many such apparatuses adversely affect the amount of ambient light provided by a window. Furthermore, many such apparatuses are ineffective for use with sub-grade windows such as basement windows. Accordingly, there exists a need for an apparatus which enhances the effectiveness of a sub-grade window located within a window well without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for an apparatus which increases the view and light incidence through a window well into a sub-grade window. Thus, the object of the present invention is to solve the aforementioned disadvantages and provide for this need.

To achieve the above objectives, it is an object of the present invention to reflect ambient sunlight and an outdoor view into a sub-grade window located within a window well or similar excavation. The system includes a first mirror, a second mirror, and a viewing pane housed within a cover.

Another object of the present invention is to convey light from the proximity of the window well through the window and into a building. The first mirror is located above an upper portion of the well and is exposed to ambient light and an outdoor view. The ambient light is reflected by the first minor downwardly into the well and to the second minor. The second mirror is located within the window well and reflects the ambient light onto a viewing pane which is aligned with the existing window.

Yet still another object of the present invention is to prevent accumulation of debris with the window well which can negatively impact the path of the ambient light. The cover is constructed of a weather-resistant material and is sealed about the building structure and well with a common flange or gasket. The cover further includes a hinge portion which enables access to the first mirror, second mirror, and interior of the window well for purposes of cleaning, maintenance, adjustment, or repair.

Yet still another object of the present invention is to provide a range of positional and angular adjustment for both the first mirror and second mirror to allow a user to selectively configure the system as needed for a specific window well. The first minor is attached at a lower end to a pair of pivot pin brackets which allow rotational motion of the first minor and at a top end to a pair of adjustment brackets including a curved track for fastening the first minor at a desired angle. The second mirror is similarly attached at a lower end to a pair of pivot pin brackets and further comprises a pair of links and a locking knob at a top end which enable selective, securable adjustment of the angle of the second mirror.

Yet still another object of the present invention is to enable use with a variety of types of minors and viewing panes to provide a range of customizability in the function and effectiveness of the passage of ambient light based upon environment, desired use, and the like. The mirrors can include common features such as a various flat or curved profiles and magnification of the transmitted view while the viewing pane can provide common light-filtering constructions such as a transparent construction, a tinted construction, or a polarized construction.

Yet still another object of the present invention is to comprise at least one (1) alternate embodiment including a pair of motors attached to the pivot pin brackets on the first and second mirror. In this alternate embodiment, the motors are powered by connection to an existing building power supply and controlled by a control assembly including separate switch controls for the first and second minor, thereby allowing a user to rotate and adjust the angle of the mirrors from within the building.

Yet still another object of the present invention is to provide a method of utilizing the device that provides a unique means of procuring a model of the system having desirable length, width, and depth dimensions based upon a particular installation; placing the well assembly containing the second mirror down into a window well; attaching the well enclosure to the building structure using fasteners; securing the first mirror; mounting the cover enclosure to the building; adjusting the mirrors to enable projection of light and scenery into the building structure by pivoting said minors and tightening the locking knobs; cleaning surfaces of the mirrors, viewing pane, and cover enclosure as needed; and, benefiting from added light and visibility of scenery while occupying a basement area of a building structure.

The method of installing and utilizing the alternate motorized embodiment of the system may be achieved by performing the following additional steps: procuring a model of the alternate motorized embodiment; mounting as previously described; routing wiring from the motors through a wall of the building; mounting the control assembly to an adjacent interior wall portion of said building structure; routing and connecting wiring from an existing power source to the control assembly; routing and connecting wiring from the motors to the control assembly; positioning the mirrors at a desired angular position using the first and second switches; and, benefiting from added light and visibility of scenery while occupying a basement area of a building structure.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 window well projection system
11 first minor
12 second minor
13 viewing pane
14a first locking knob
14b second locking knob
15a first pivot pin bracket
15b second pivot pin bracket
16a first adjustment bracket
16b second adjustment bracket
17a first adjustment bracket pin
17b second adjustment bracket pin
18a first adjustment arm
18b second adjustment arm
19a first adjustment arm slot
19b second adjustment arm slot
21 fastener
24a third locking knob
24b fourth locking knob
25 fifth locking knob
26 guide slot
27a first guide pin
27b second guide pin
28a first link
28b second link
29 guide
30 well assembly
31 well enclosure
32 well flange
33a first pivot pin
33b second pivot pin
34 second minor bracket
35a first minor frame
35b second minor frame
36a third pivot pin
36b fourth pivot pin
37 well bottom
38a third pivot pin bracket
38b fourth pivot pin bracket
39a first well mounting flange
39b second well mounting flange
41 first reflection
42 second reflection
43 scenery
44 first direction
45 second direction
46 third direction
50 cover enclosure
51 hinge
52 seal
60 structure
70 ground
71 excavation
72 viewing pane frame
90 existing window well
95 below-grade window
100 motorized embodiment
104 alternate well enclosure
106 alternate well flange
108 alternate well bottom 110 first motor
112 second motor
113 motor shaft
114 mounting bracket
116 jam nut
120 wiring
124 control assembly
126 control box
128 first switch
130 second switch
140 power source

DETAILED DESCRIPTION OF THE PREFERRED EMBODIMENT

Figure 4:
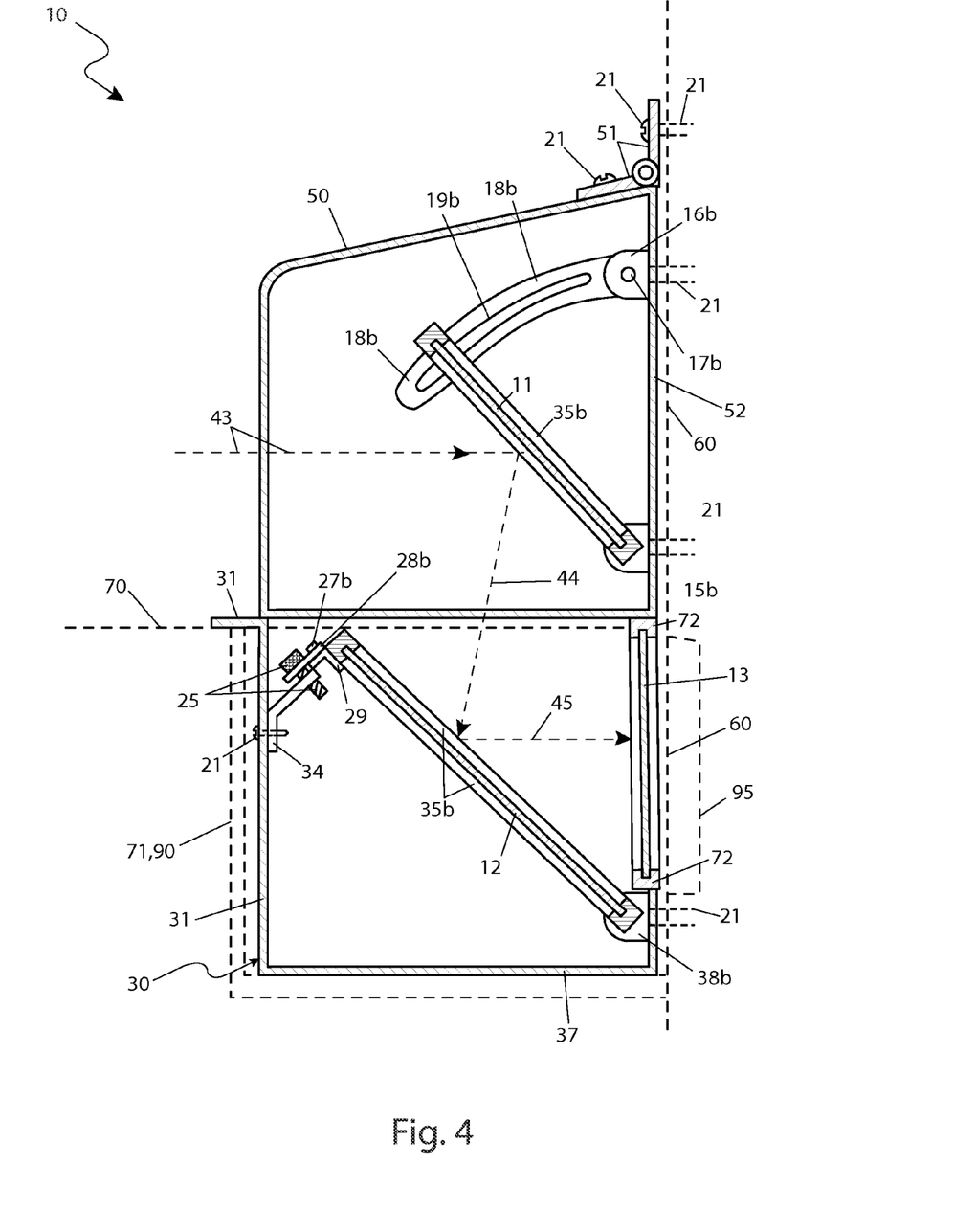
FIG. 4 is a section view of the window well projection system 10 taken along section line A-A (see FIG. 1), according to a preferred embodiment of the present invention.
Figure 5A:
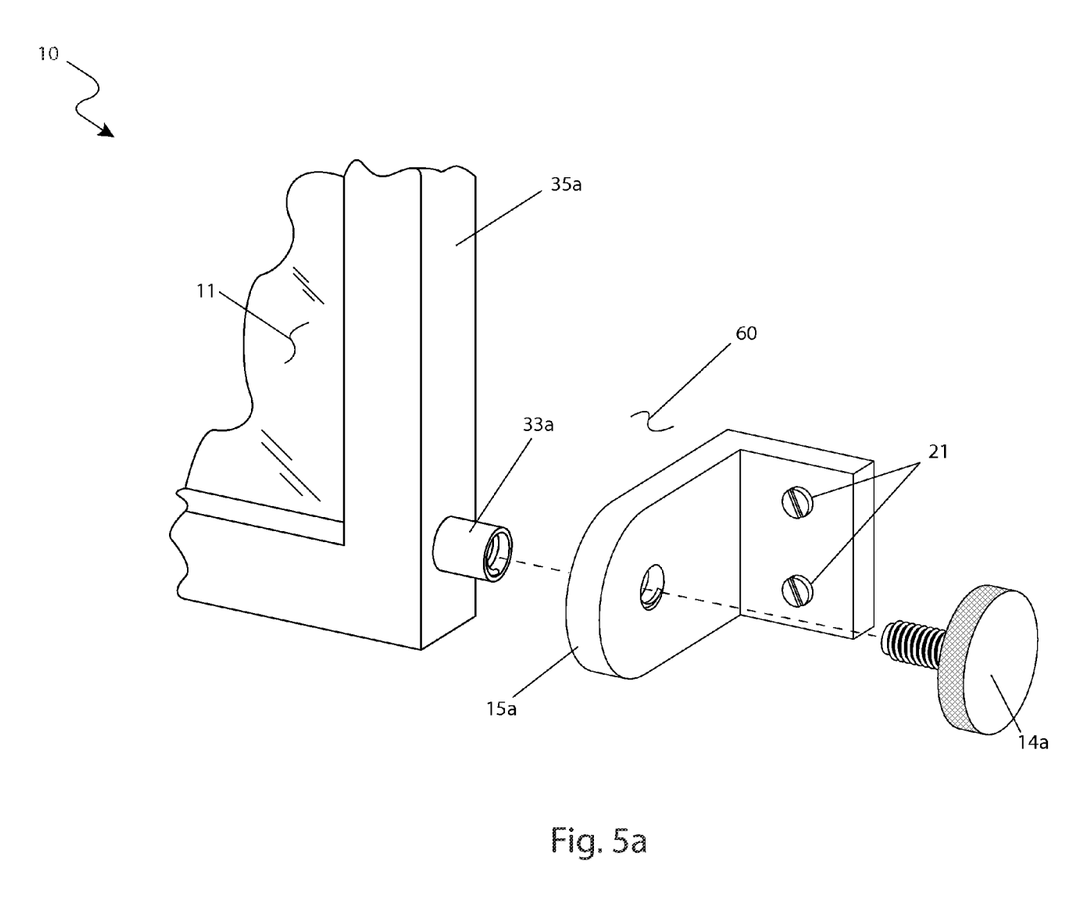
FIG. 5a is a close-up view of an attachment portion of a first mirror portion 11, according to a preferred embodiment of the present invention.
Figure 5B:
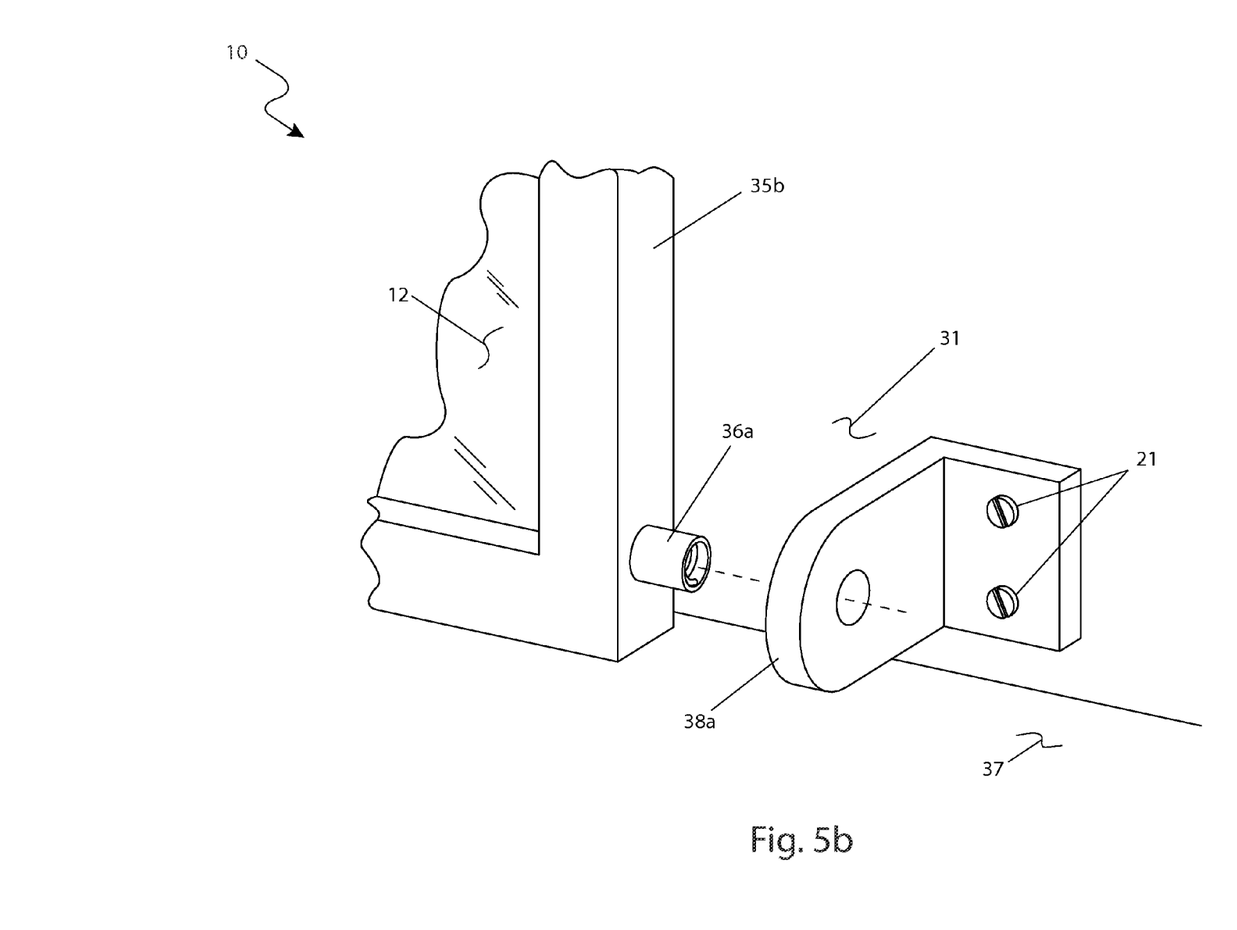
FIG. 5b is a close-up view of an attachment portion of a second minor portion 12, according to a preferred embodiment of the present invention.
Figure 6:
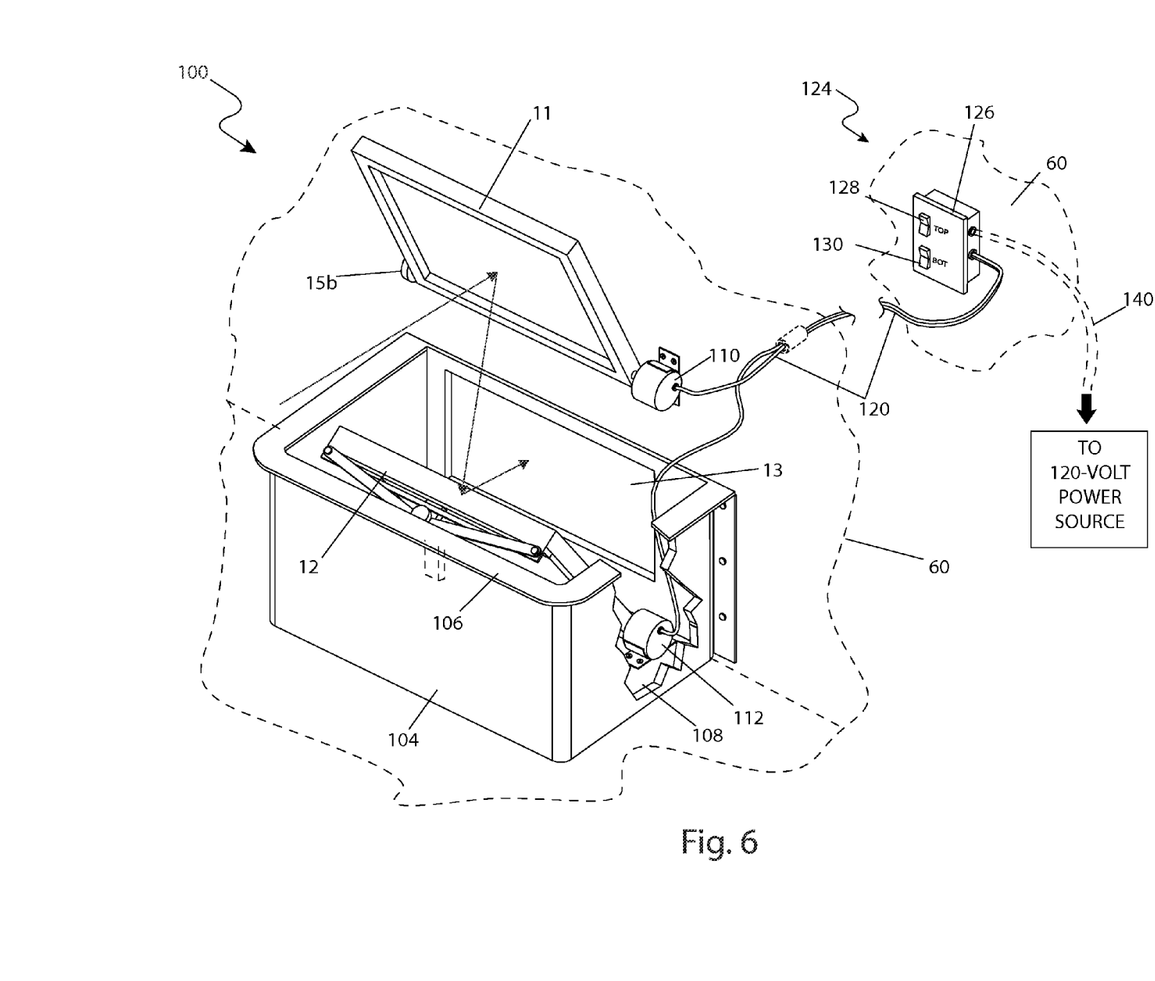
FIG. 6 is a perspective view of a motorized embodiment 100 of the window well projection system 10, according to an alternate embodiment of the present invention.
Figure 7:
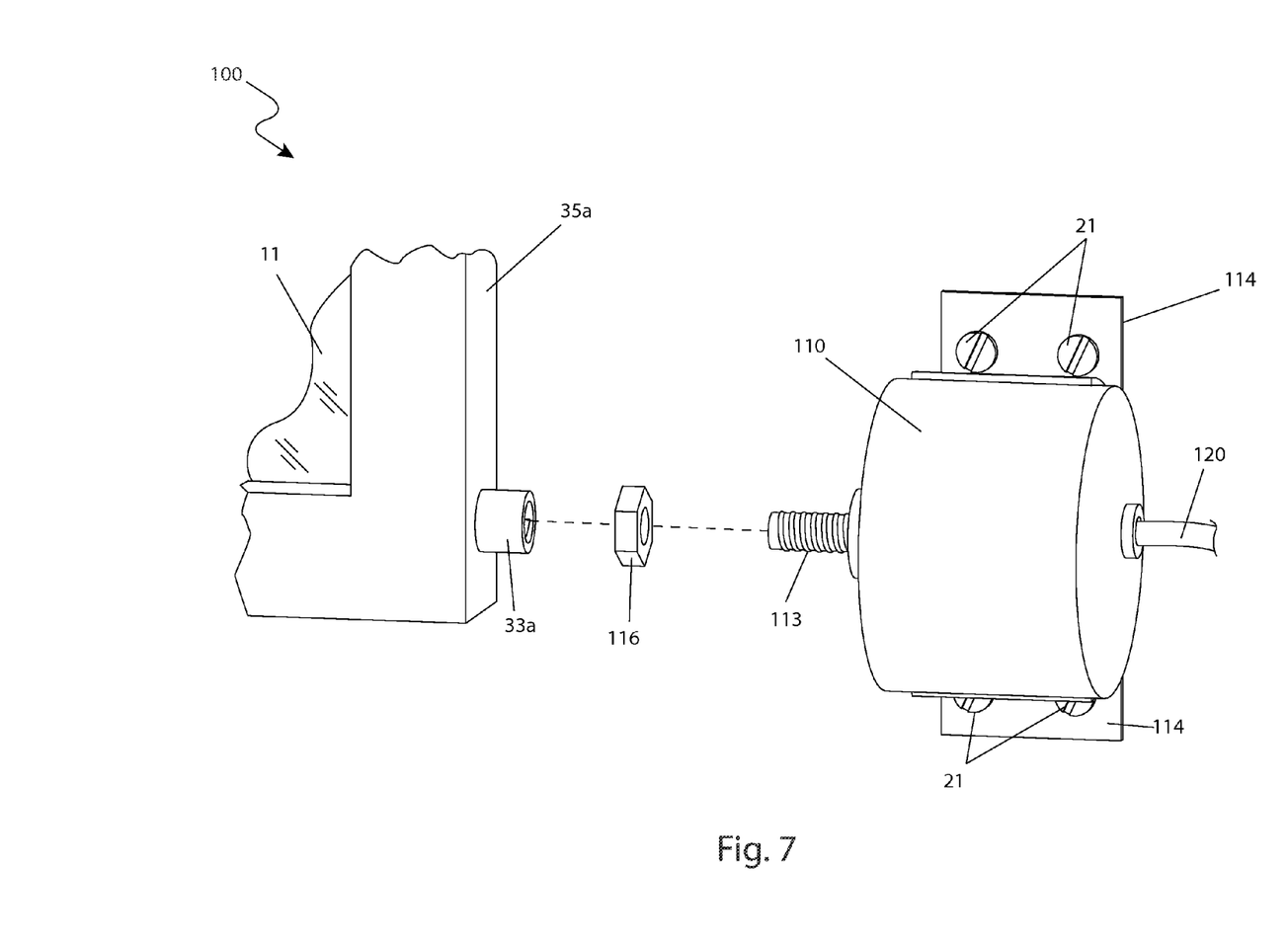
FIG. 7 is a close-up view of a first motor portion 110 of the motorized embodiment 100 of the window well projection system 10, according to an alternate embodiment of the present invention.
Figure 8:
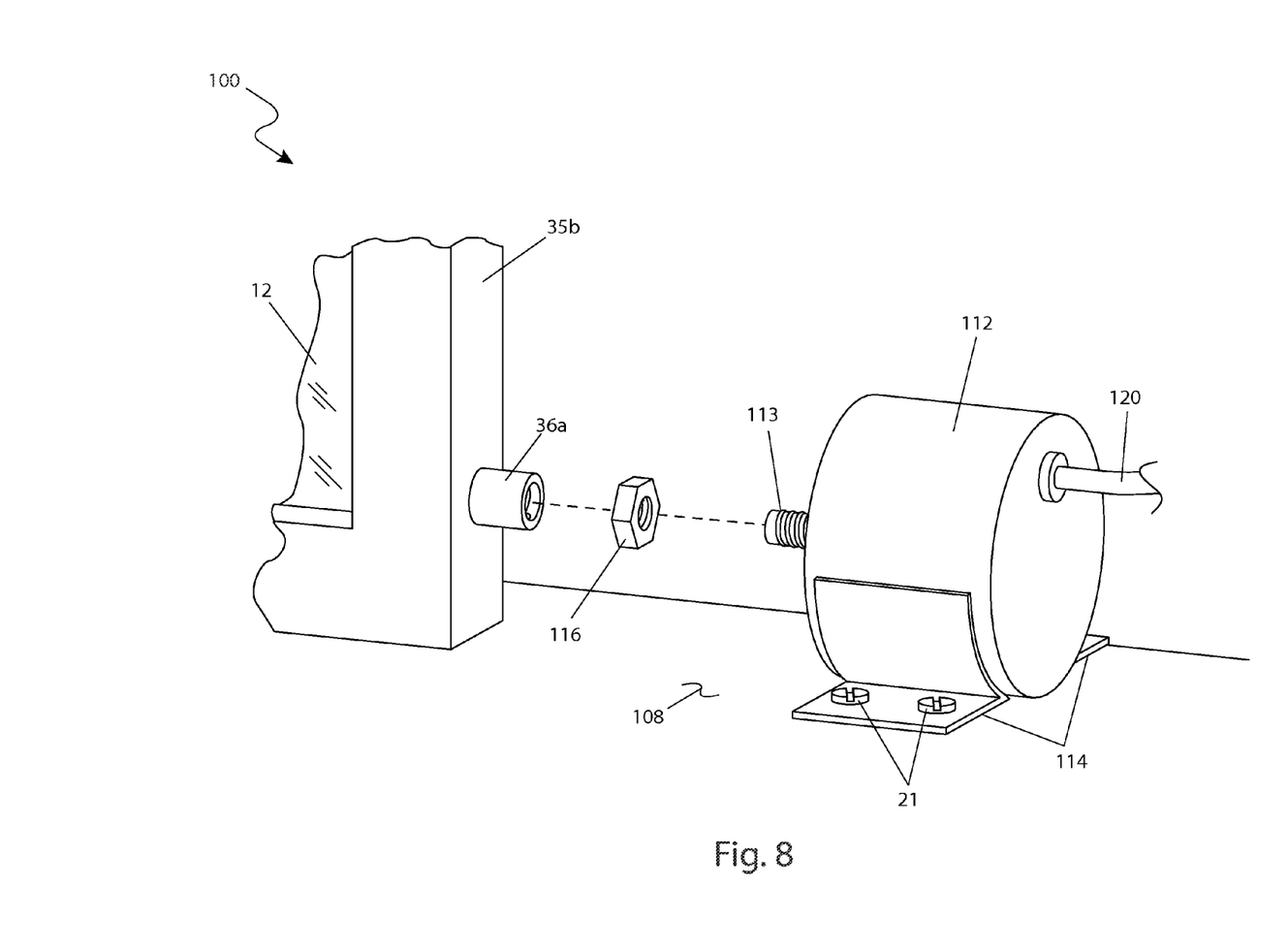
FIG. 8 is a close-up view of a second motor portion 112 of the motorized embodiment 100 of the window well projection system 10, according to an alternate embodiment of the present invention; and, FIG. 9 is an electrical block diagram of the motorized embodiment 100 of the window well projection system 10, according to an alternate embodiment of the present invention.
Figure 9:
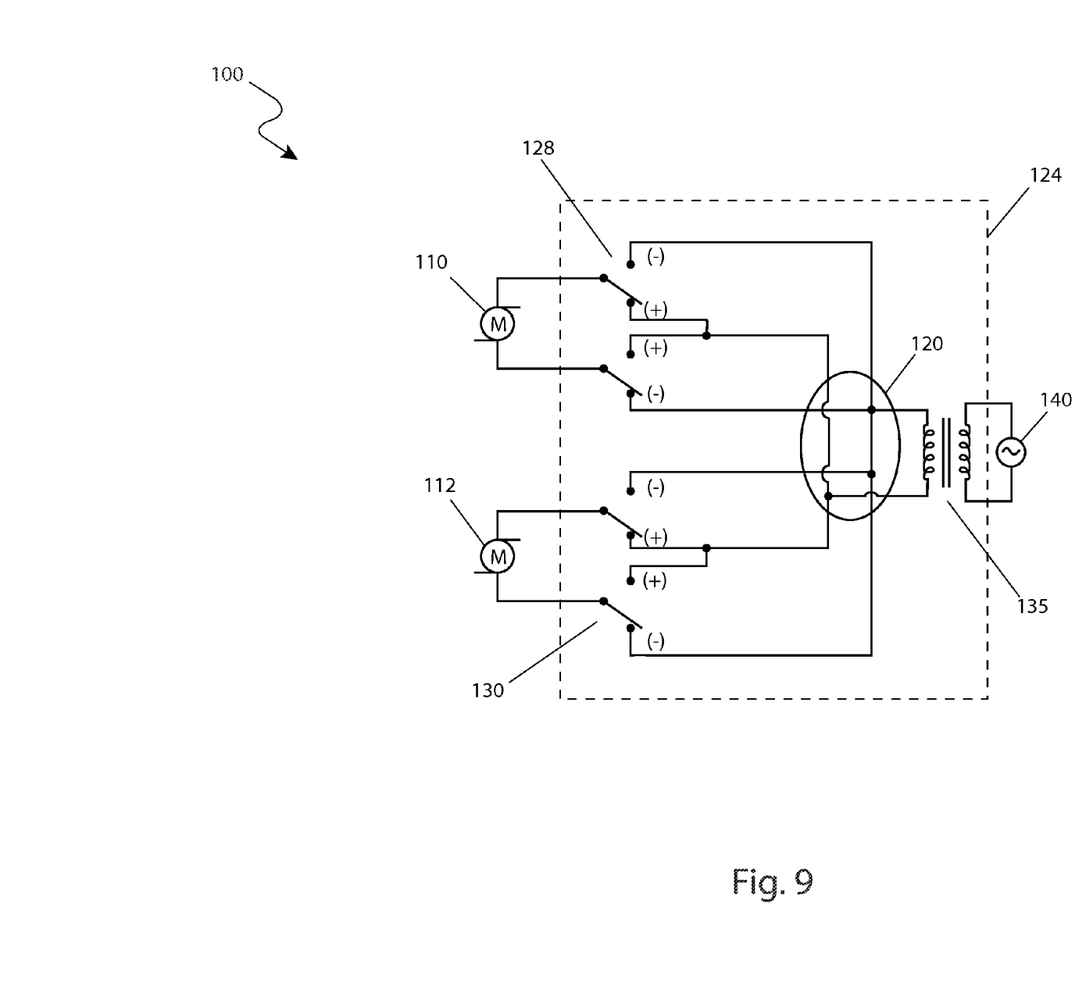

The best mode for carrying out the invention is presented in terms of its preferred embodiment, herein depicted within FIGS. 1 through 5, and in terms of an alternate motorized embodiment, herein depicted within FIGS. 6 through 8. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a window well projection system (herein described as the "system") 10, which provides a means for reflecting daylight and a view of an outdoor scenery 43 into a below-grade basement window portion 95 of a building structure 60, wherein a box-like well assembly 30 is installed down into an excavation 71 or within an existing below-grade window well 90. The system 10 may be introduced having a variety of length, width, and depth dimensions based upon a user's preference or to conform to an existing window well 90 shape, size, and depth.

Figure 1:
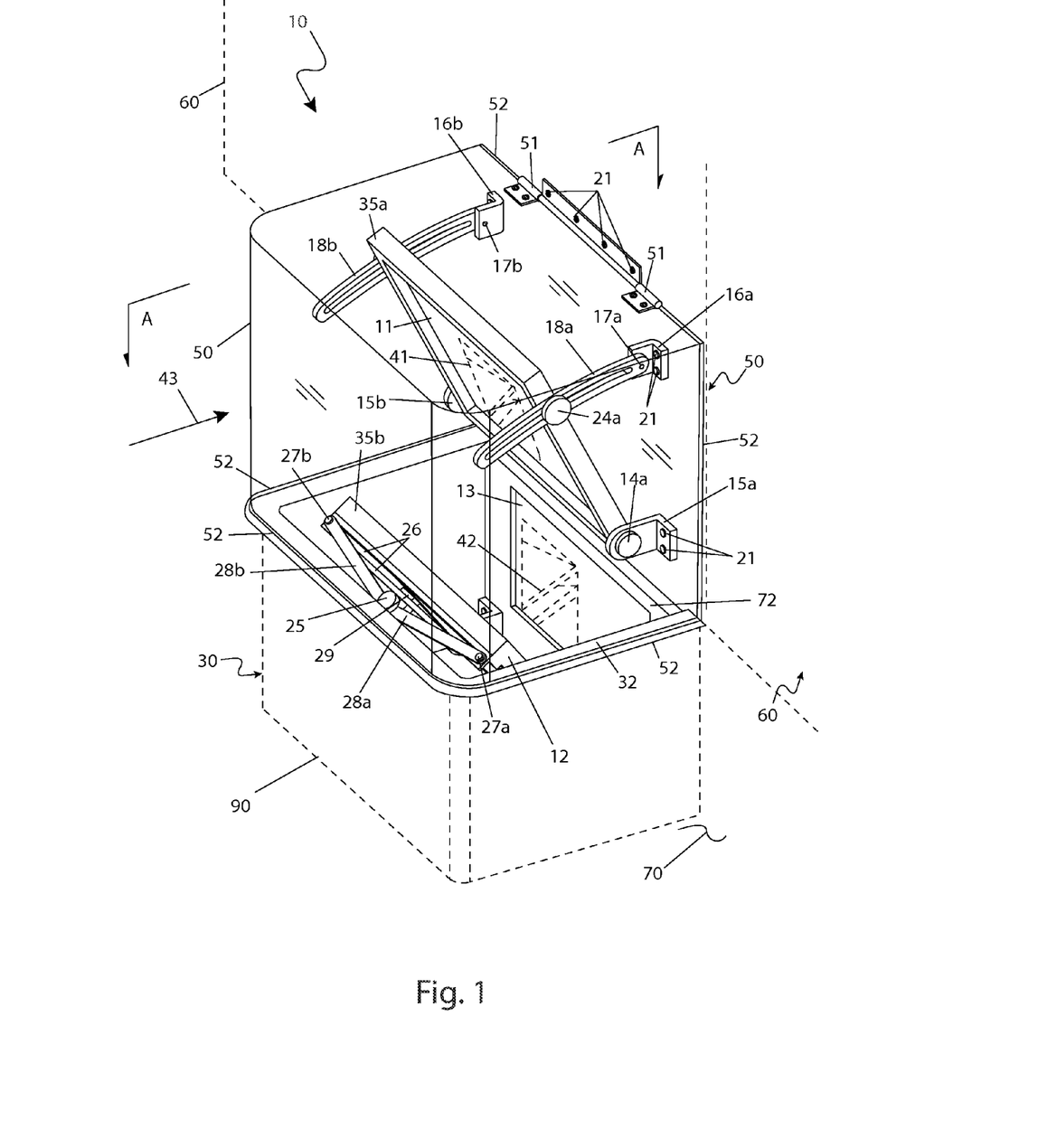
FIG. 1 is an environmental perspective view of a window well projection system 10, according to a preferred embodiment of the present invention.

Referring now to FIG. 1, an environmental perspective view of the system 10, according to the preferred embodiment of the present invention, is disclosed. The system 10 comprises a first minor 11, a second minor 12, and a viewing pane 13. The first minor 11 is located above an upper edge portion of a well assembly portion 30 of the system 10 and enables receipt of ambient daylight and a view of outdoor scenery 43 via a first reflection 41. The first reflection 41 is then deflected downwardly onto a second mirror 12 located within the well assembly 30 to produce a second reflection 42. The second minor 12 in turn deflects the second reflection 42 onto a viewing pane 13, thus providing the basement within the building structure 60 with daylight which passes through said viewing pane 13 and an existing below-grade window 95, if so configured. The view of the scenery 43 is projected by means of the reflection from the first minor 11 thereonto the second minor 12 and onto the viewing pane 13. The system 10 further comprises a weather-resistant above-grade cover enclosure 50 which is attached thereto the building structure 60 by means of a loose-pin hinge 51 and a plurality of fasteners 21 and sealed by means of a form-fitting soft peripheral seal 52 which bears against the building structure 60 and a grade-level well flange portion 32 of the well assembly 30. Said seal 52 is envisioned to comprise a compliant gasket means being adhesively bonded to edge portions of said cover enclosure 50 using common weather-resistant materials such as, but not limited to: a closed-cell foam-rubber strip, a non-hardening elastomeric caulk, or the like. The well flange 32 is illustrated here depicting an integral narrow horizontally-extending border structure; however, it is understood that said well flange 32 may also be introduced having a greater outwardly extending form, thereby acting as an effective flashing to cover and seal a perimeter edge of variously sized existing window wells 90, if so installed. Furthermore, it is envisioned that the extending well flange 32 may be trimmed by a user to match a border portion of said existing window well 90, be it round, oval-shaped, semi-circular, or the like, thereby providing an effective means to avoid accumulation of debris within said existing window well 90, while also providing an aesthetic appearance.

The hinge portion 51 of the cover enclosure 50 is intended to allow an easy access into an interior portion of the system 10 for cleaning and/or repair. The cover enclosure 50 is envisioned to be made of a clear plastic material such as PLEXIGLAS® or LEXAN® and may be tinted, darkened, or curved, as desired, as a means of enhancing the transmission of the illumination or the reflection of the scenery 43. It is envisioned that the cover enclosure 50 may be introduced having various length, width, and depth dimensions based upon particular applications. It is further envisioned that a top panel portion of said cover enclosure 50 may slope downwardly at an angle, thereby promoting removal of water, snow, debris, and the like. The first mirror 11 and the second mirror 12 are envisioned to be made materials such as, but not limited to: state-of-the-art back-silvered glass, polished aluminum, stainless steel, chrome clad plastic, or the like, being encased within a captivating rectangular first minor frame 35a and second minor frame 35b, respectively. Said minor frames 35a, 35b are envisioned being made of aluminum, wood, steel, vinyl, or the like, being finished so as to match an existing décor of the building structure 60. Furthermore, said minors 11 and 12 may be configured as flat, curved, parabolic, or magnifying, depending on a desired effect. The viewing pane 13 is envisioned being made of a plastic material such as PLEXIGLAS® or LEXAN®, installed within a viewing pane frame 72, and may be left in an original transparent state or may be tinted, polarized, or the like based upon a user's preference to produce a desired special effect. It is further understood that the viewing pane 13 may be utilized in place of an existing below-grade window 95 or in addition to said existing below-grade window 95 with equal benefit.

Figure 2:
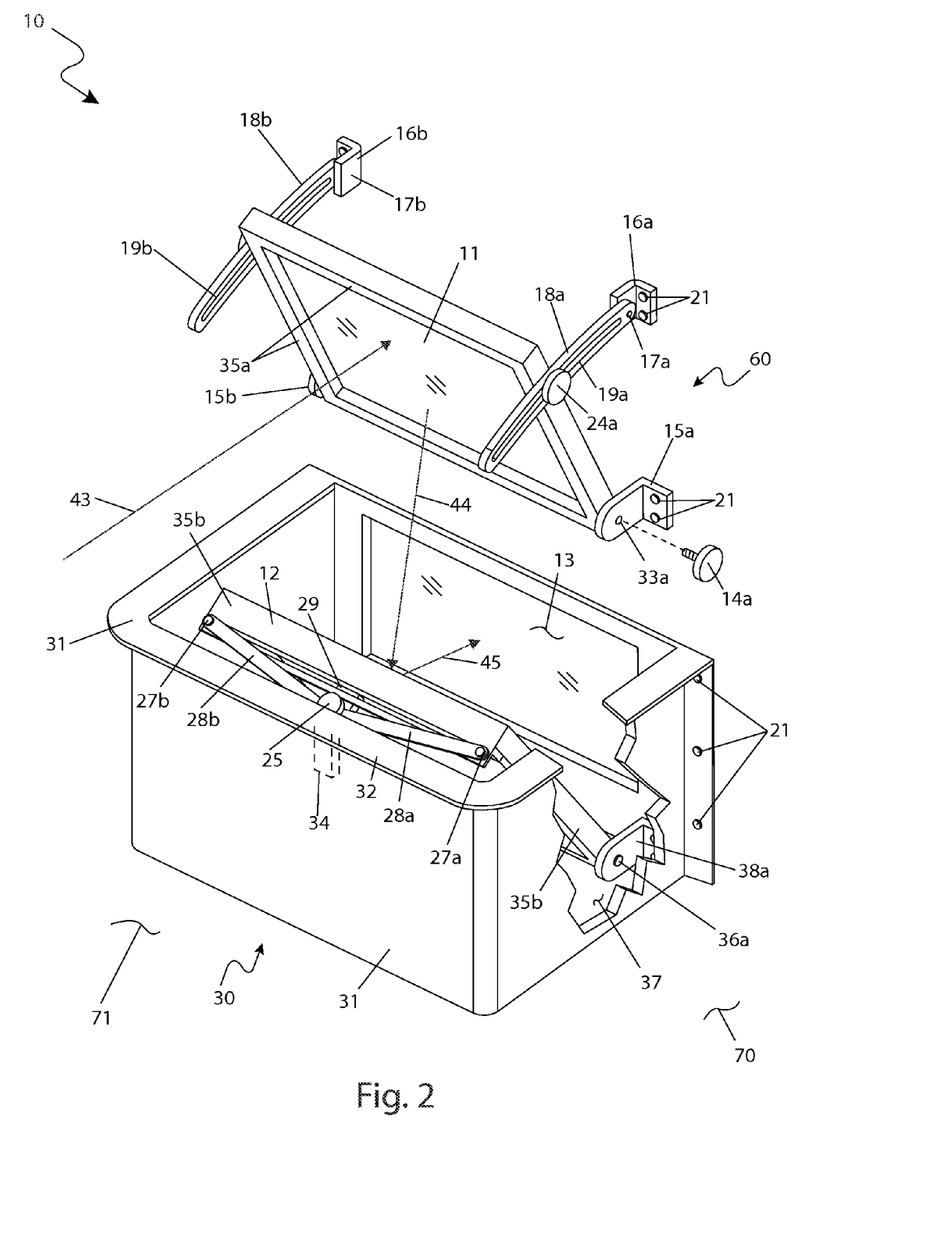
FIG. 2 is a right-side cut-away environmental view of the window well projection system 10, according to the preferred embodiment of the present invention.
Figure 3:
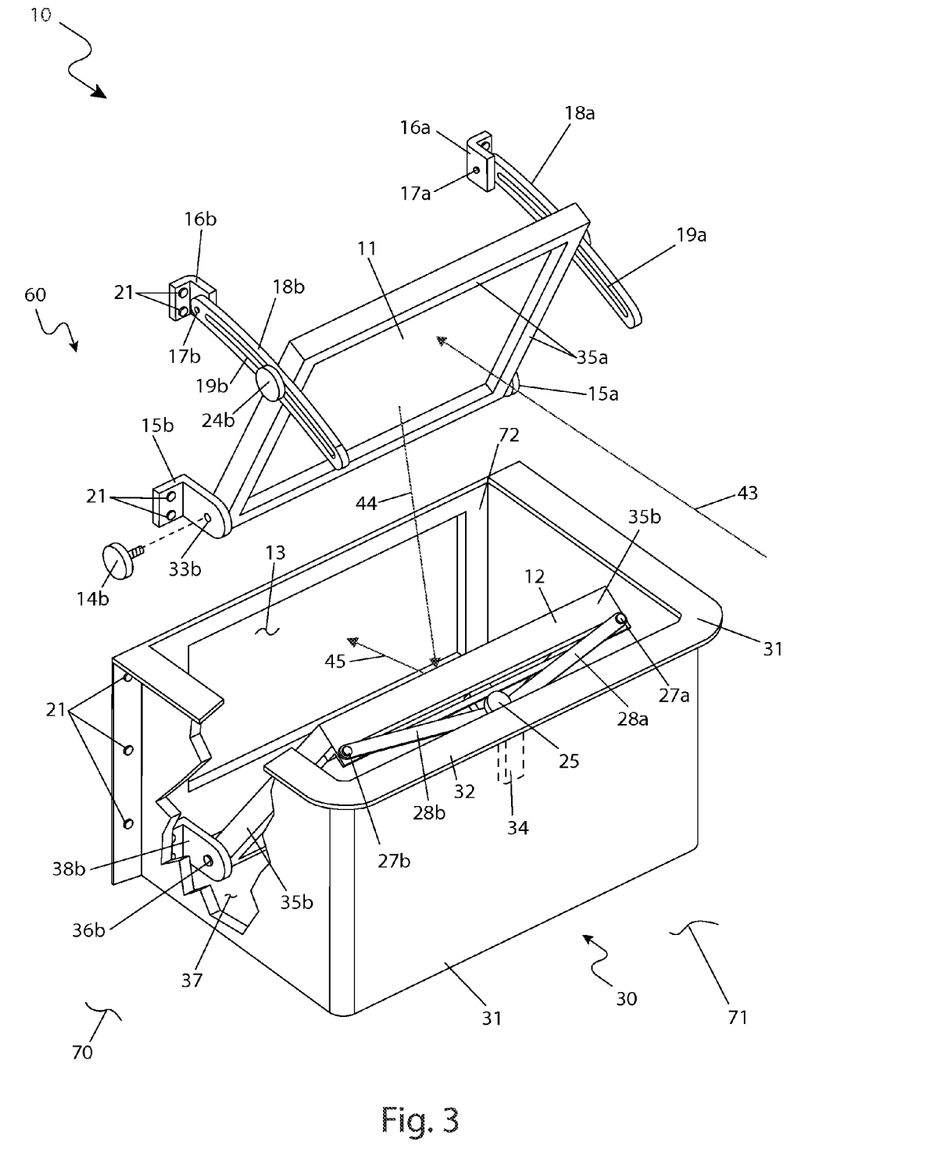
FIG. 3 is a left-side cut-away environmental view of the window well projection system 10, according to the preferred embodiment of the present invention.

Referring now to FIGS. 2, 3, and 4, cut-away views and a section view of the system 10, respectively, according to the preferred embodiment of the present invention, are disclosed. The system 10 is depicted in FIGS. 2 and 3 without the cover enclosure 50 for illustration sake (see FIG. 1). The system 10 further provides a means of mounting the first mirror 11 to a building structure 60 by which a tilting angle may be adjusted until the first mirror 11 encompasses the scenery 43 in a desirable configuration. The first minor 11 mounting means comprises a first pivot pin bracket 15a and a second pivot pin bracket 15b each of which is fastened to the structure 60 by a plurality of fasteners 21. Said pivot pin brackets 15a, 15b comprise "L"-shaped fixtures arranged in minor fashion further comprising integral aperture portions which provide pivotal mounting of integral first pivot pin 33a and second pivot pin 33b portions of a first minor frame portion 35a of the first minor 11. A horizontal space between said first 15a and second 15b pivot pin brackets allows insertion of the first minor 11 in between while being centrally mounted above the well assembly 30. The first pivot pin 33a and second pivot pin 33b portions of the first mirror frame 35a are located along lower side portions of said first mirror frame 35a along a common axis to provide a pivoting attachment means of the first mirror 11 to said pivot pin brackets 15a, 15. Said pivot pin brackets 15a, 15 are secured via a first locking knob 14a and an opposing second locking knob 14b, respectively (also see FIG. 5a).

Furthermore, said first mirror 11 provides an angular adjustment and locking means via a respective first adjustment bracket 16a and a second adjustment bracket 16b being in sliding mechanical communication with a respective first adjustment arm 18a and a second adjustment arm 18b. Said first 16a and second 16b adjustment brackets comprise "L"-shaped angle fixtures being similar in construction to the aforementioned first 15a and second 15b pivot pin brackets to allow the first mirror 11 to be slidingly captured between the first adjustment arm 18a and the second adjustment arm 18b. Said first 16a and second 16b adjustment brackets are anchored to the building structure 60 by means of the plurality of fasteners 21. At a distal end, the first adjustment arm 18a is pivotally attached to the first adjustment bracket 16a by means of an integral first adjustment bracket pin 17a while the second adjustment arm 18b is pivotally attached thereonto the second adjustment bracket 16b by means of an integral second adjustment bracket pin 17b. Said adjustment arms 18a, 18b comprise arcuate flat members further comprising a central arcuate first adjustment arm slot 19a and a second adjustment arm slot 19b, respectively, which allow selective sliding adjustment and securing of a desired angular position of the first minor 11 via threaded engagement of a third locking knob 24a and fourth locking knob 24b being inserted through said adjusting arm slots 19a, 19b, and threadingly engaging opposing side surfaces of the first mirror frame portion 35a. Upon obtaining a desired tilt angle, the first mirror 11 is secured by tightening the first locking knob 14a, the second locking knob 14b, the third locking knob 24a, and the fourth locking knob 24b. Said locking knobs 14a, 14b, 24a, 24b are envisioned to comprise common knurled or winged knobs having threaded stud portions.

The system 10 comprises a below-grade well assembly 30 which provides a housing means, an anchoring means, and an adjusting means to the second minor 12. The well assembly 30 comprises an open-top rectangular-shaped molded plastic well enclosure 31 further comprising a viewing pane 13 on a rear side surface, a well flange 32 which extends along three (3) upper edges, a second minor bracket 34, a well bottom 37, a first well mounting flange 39a, and a second well mounting flange 39b. The well enclosure 31 is mounted to the building structure 60 at a below-grade elevation within an excavation 71 or within an existing window well 90. Said well enclosure 31 is attached to said building structure 60 via said first 39a and second 39b well mounting flanges which extend outwardly at right angles, being integral to opposing vertical edges of said well enclosure 31, being affixed using common fasteners 21 (see FIGS. 2 and 3). Furthermore, said well enclosure 31 is to be mounted to said building structure 60 so as to laterally align the viewing pane 13 with an existing below-grade window 95 if so configured. The second mirror 12 is pivotally mounted to a rear wall portion of the well enclosure 31 at lower rear corner areas in a similar manner as the previously described first minor 11. The second mirror frame portion 35b of the second mirror 12 comprises integral third pivot pin 36a and fourth pivot pin 36b portions, and corresponding third pivot pin bracket 38a and a fourth pivot pin bracket 38b members which provide similar construction and function as the previously described first pivot pin bracket 15a, second pivot pin bracket 15b, first pivot pin 33a, second pivot pin 33b.

The second minor 12 provides an angular adjustment means further comprising a fifth locking knob 25, a first link 28a, a second link 28b, a guide 29, and a second mirror bracket 34. The second mirror bracket 34 comprises an "L"-shaped fixture which provides a means to attach angular adjustment members of said second mirror 12 to a front wall surface of the well enclosure 31 using at least one (1) common fastener 21. Inwardly overlapping end portions of the links 28a, 28b are stacked upon each other and pivotally affixed to the second mirror bracket 34 via insertion of a stud portion of the fifth locking knob 25 through aperture portions of the links 28a, 28b and subsequent threaded engagement with a corresponding threaded aperture portion of the second minor bracket 34. Cylindrical pin portions 27a, 27b are permanently affixed to and extend perpendicularly from outer end portions of each link 28a, 28b and are guided within a slot portion 26 of the guide 29 as an angle of the second mirror 12 is adjusted. Said guide 29 is permanently affixed thereto an upper edge portion of the second mirror frame 35b. To adjust the angle of the second minor 12, a user motions outer end portions of the links 28a, 28b toward each other to decrease the angle of the second minor 12, and conversely, motions outer end portions of the links 28a, 28b away from each other to increase the tilt angle of the second mirror 12. Tightening a fifth locking knob 25 acts to clamp the links 28a, 28b against the second minor bracket 34, thereby securing the second mirror 12 in position at a desired angle.

Referring now to FIG. 5a, a close-up view of an attachment portion of a first mirror portion 11, according to a preferred embodiment of the present invention, is disclosed. The first mirror frame 35a is pivotally attached to a building structure 60 via the first pivot pin bracket 15a and the first locking knob 14a. The first pivot pin bracket 15a is affixed to said building structure 60 using common fasteners 21. Once the first minor 11 is adjusted to a desired angle, said first locking knob 14a is tightened to clamp the first pivot pin bracket 15a against the first pivot pin 33a to angularly secure said first mirror 11. The opposing side of the first minor 11 is attached, adjusted, and secured in like manner using a corresponding second pivot pin bracket 15b and second locking knob 14b (see FIG. 3).

Referring now to FIG. 5b, a close-up view of an attachment portion of a second minor portion 12, according to a preferred embodiment of the present invention, is disclosed. The second minor 12 is pivotally attached to a rear side of the well enclosure 31 via the third pivot pin bracket 38a which is affixed to said well enclosure 31 using common fasteners 21. Once the second minor 12 is adjusted to a desired angle, the fifth locking knob 25 is tightened within the second mirror bracket 34 to secure the second minor 12 in position (see FIG. 2). The opposing side of the second mirror 12 is attached in like manner using a corresponding third pivot pin bracket 38b (see FIG. 3).

Referring now to FIGS. 6 and 7, perspective and close-up views of a motorized embodiment 100 of the window well projection system 10, according to an alternate embodiment of the present invention, are disclosed. The alternate motorized embodiment 100 comprises an alternate well enclosure 104 which further comprises an alternate well flange 106 and an alternate well bottom 108, all being sized so as to facilitate additional first motor 110 and a second motor 112 portions.

The first 11 and second 12 mirrors are depicted here being angularly adjustable via the respective first motor 110 and second motors 112. Said motors 110, 112 are threadingly attached to corresponding first pivot pin 33a and third pivot pin 36a members; however, said motors 110, 112 may also be mounted to opposing second pivot pin 33b and fourth pivot pin 36b portions with equal benefit and as such should not be interpreted as a limiting factor of the system 10. Said motors 110, 112 each comprise threaded motor shaft portions 113 being secured to said first pivot pin 33a and third pivot pin 36a members using a common jam nut 116 or equivalent "non-rotating" device. Said motors 110,112 further comprise permanently attached or integral mounting bracket portions 114 which extend outwardly from a bottom portion of each motor 110, 112, thereby enabling rigid attachment to respective building structure 60 and alternate well bottom 108 surfaces using common fasteners 21 such as screws, rivets, or the like. The motors 110, 112 comprise commercially available bi-directional direct current (DC) cylindrical units having integral gear reducers which act to multiply an output torque, thereby allowing smooth and accurate positioning of respective mirrors 11, 12.

The angle of the mirrors 11, 12 may be adjusted by a user within the building structure 60 via a wall-mounted control assembly 124 which further comprises a control box 126, a first switch 128, and a second switch 130. Said control assembly 124 is shown here in a rotated orientation for illustration sake. The first switch 128 directs a polarized DC current to the first motor 110 to provide an angular "UP" and "DOWN" positioning of the first mirror 11. The second switch 130 provides similar activation of the second motor 120 to angularly position the second mirror 12. Said control assembly 124 is envisioned to be hard wired to an existing 120-volt power source 140 within the building structure 60 (see FIG. 8).

Referring now to FIG. 8, an electrical block diagram of the motorized embodiment 100 of the window well projection system 10, according to an alternate embodiment of the present invention, is disclosed. The control assembly 124 is envisioned to be hard wired to an existing 120-volt power source 140 within the building structure 60, further providing conversion of said 120-volt power supply 140 to a 12-volt DC current via an internal transformer 135. The control assembly 124 in turn controls a DC current to the motors 110, 112. The motors 110, 112 comprise common bi-directional high-torque DC units. The first switch 128 comprises a three-position double-pole double-throw (DPDT) rocker switch component having a spring-return center function, thereby providing angular "UP" and "DOWN" bi-directional activation of the first motor 110 to selectively position the first mirror 11. The second switch 130 provides similar "UP" and "DOWN" activation to angularly position the second mirror 12. However, it is understood that various other switching components may be utilized to direct current to the motors 110, 112 such as rotary dials, toggle switches, and the like with equal benefit and should not be interpreted as a limiting factor of the system 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIGS. 1 and 4.

The method of utilizing the system 10 may be achieved by performing the following steps: procuring a model of the system 10 having desirable length, width, and depth dimensions based upon a particular installation; providing a suitable excavation 71 adjacent to a below-grade window 95, if applied to an original below-grade window installation; installing the well assembly 30 within the excavation 71, or; placing the well assembly 30 containing the second mirror 12 down into an existing window well 90; positioning the well mounting flanges 39a, 39b against the building structure 60 in a desired lateral position, or aligning the viewing pane portion 13 of the well enclosure 31 with an existing below-grade window portion 95 based upon a particular installation; attaching the well enclosure 31 to the building structure 60 using fasteners 21; positioning and anchoring the pivot pin brackets 15a, 15b, the adjustment brackets 16a, 16b, the adjustment arms 18a, 18b, and the first minor 11, as an assembly, to the building structure 60 using the fasteners 21; securing said first minor 11 in angular position by threadingly affixing the first 14a, second 14b, third 24a, and fourth 24b locking knobs; mounting the cover enclosure 50 to the building structure 60 by drilling and mounting the hinge portion 51 of said cover enclosure 50 using the fasteners 21; positioning the minors 11 and 12 in an angular manner to enable projection of light and scenery 43 into the building structure 60 by pivoting said mirrors 11, 12 and tightening the locking knobs 14a, 14b, 24a, 24b, 25; cleaning surfaces of the minors 11, 12, viewing pane 13, and cover enclosure 50 as needed to improve transmission of reflected light 41, 42 into the building structure 60; lowering the cover enclosure 50 onto the well flange 32 to enable the weather-resistant seal 52; and, benefiting from added light and visibility of scenery 43 while occupying a basement area of a building structure 60 afforded a user of the present invention 10.

The method of installing and utilizing the alternate motorized embodiment 100 of the system 10 may be achieved by performing the following additional steps: procuring a model of the alternate motorized embodiment 100 having desirable length, width, and depth dimensions; placing the alternate well enclosure 114 containing the pre-assembled second mirror 12 and second motor 112 into the excavation 71 or into the existing window well 90; mounting the alternate well enclosure 114 to the building structure 60 in like manner as the previously described preferred embodiment 10; positioning and anchoring the second pivot pin bracket 15b, the first minor 11, and the first motor 110, as an assembly, to the building structure 60 using the fasteners 21; mounting the cover enclosure 50 as previously described; routing wiring 120 from said motors 110, 112 through a wall portion of the building structure 60; mounting the control assembly 24 to an adjacent interior wall portion of said building structure 60; routing and connecting wiring 120 from an available existing 120-volt power source 140 to the control assembly 124; routing and connecting wiring 120 from the motors 110, 112 to the control assembly 124; positioning the minors 11 and 12 at a desired angular position using respective first 128 and second 130 switches, and, lowering the cover enclosure 50 against the building structure 60 and alternate well flange 106 to provide a weather-resistant seal.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A window well projection system for reflecting daylight and a view of an outdoor scenery into a basement of a structure, said window well projection system comprising:
    a top enclosure;
    a first mirror seated within said top enclosure and capable of directing a first reflection of outdoor scenery;
    a well enclosure seated beneath said top enclosure;
    a second mirror seated within said well enclosure and capable of receiving said first reflection as well as directing a second reflection of the outdoor scenery toward the basement of the structure;
    first and second pivot pin brackets pivotally coupled to said first mirror;
    first and second adjustment arms spaced above said first and second pivot pin brackets;
    first and second adjustment brackets attached to said first and second adjustment arms respectively;
    first and second slots formed within said first and second adjustment arms respectively; and,
    a viewing pane located at said well enclosure and capable of receiving said second reflection for viewing from within the basement of the structure;
    wherein said first mirror is slidingly captured between said first and second adjustment arms.

2. The window well projection system of claim 1, further comprising: a hinge portion pivotally coupled to a top end of said top enclosure.

3. The window well projection system of claim 1, wherein said top enclosure is transparent.

4. The window well projection system of claim 1, wherein said first and second adjustment arms have arcuate shapes respectively.

5. The window well projection system of claim 1, further comprising:
    a second mirror bracket connected to said well enclosure;
    first and second links pivotally coupled to said second mirror bracket;
    a guide attached to said second minor and having a slot portion; and,
    a plurality of pin portions extending out from said first and second links and guided within said slot portion of said guide as an angle of the second minor is adjusted.

6. The window well projection system of claim 1, further comprising:
    first and second motors including threaded motor shaft portions respectively secured to said first and second mirrors respectively; and,
    wherein respective angles of said first and second minors are adjusted when said first and second motors rotate in a corresponding directions respectively.

7. A window well projection system for reflecting daylight and a view of an outdoor scenery into a basement of a structure, said window well projection system comprising:
    a top enclosure adapted to be located above the basement of the structure;
    a first mirror seated within said top enclosure and capable of downwardly directing a first reflection of outdoor scenery;
    a well enclosure seated beneath said top enclosure and adapted to be located at a below-grade elevation adjacent to the basement of the structure;
    a second mirror seated within said well enclosure and capable of receiving said first reflection as well as directing a second reflection of the outdoor scenery toward the basement of the structure;
    first and second pivot pin brackets pivotally coupled to said first mirror;
    first and second adjustment arms spaced above said first and second pivot pin brackets;
    first and second adjustment brackets attached to said first and second adjustment arms respectively;
    first and second slots formed within said first and second adjustment arms respectively; and,
    a viewing pane located at said well enclosure and capable of receiving said second reflection for viewing from within the basement of the structure;
    wherein said first mirror is slidingly captured between said first and second adjustment arms; and,
    wherein said first and second minors are pivotally adjustable to desired viewing and reflecting angles respectively.

8. The window well projection system of claim 7, further comprising: a hinge portion pivotally coupled to a top end of said top enclosure.

9. The window well projection system of claim 7, wherein said top enclosure is transparent.

10. The window well projection system of claim 7, wherein said first and second adjustment arms have arcuate shapes respectively.

11. The window well projection system of claim 7, further comprising:
    a second mirror bracket connected to said well enclosure;
    first and second links pivotally coupled to said second mirror bracket;
    a guide attached to said second minor and having a slot portion; and,
    a plurality of pin portions extending out from said first and second links and guided within said slot portion of said guide as an angle of the second minor is adjusted.

12. The window well projection system of claim 7, further comprising:
    first and second motors including threaded motor shaft portions respectively secured to said first and second mirrors respectively; and,
    wherein respective angles of said first and second minors are adjusted when said first and second motors rotate in a corresponding directions respectively.

* * * * *